UNITED STATES PATENT OFFICE.

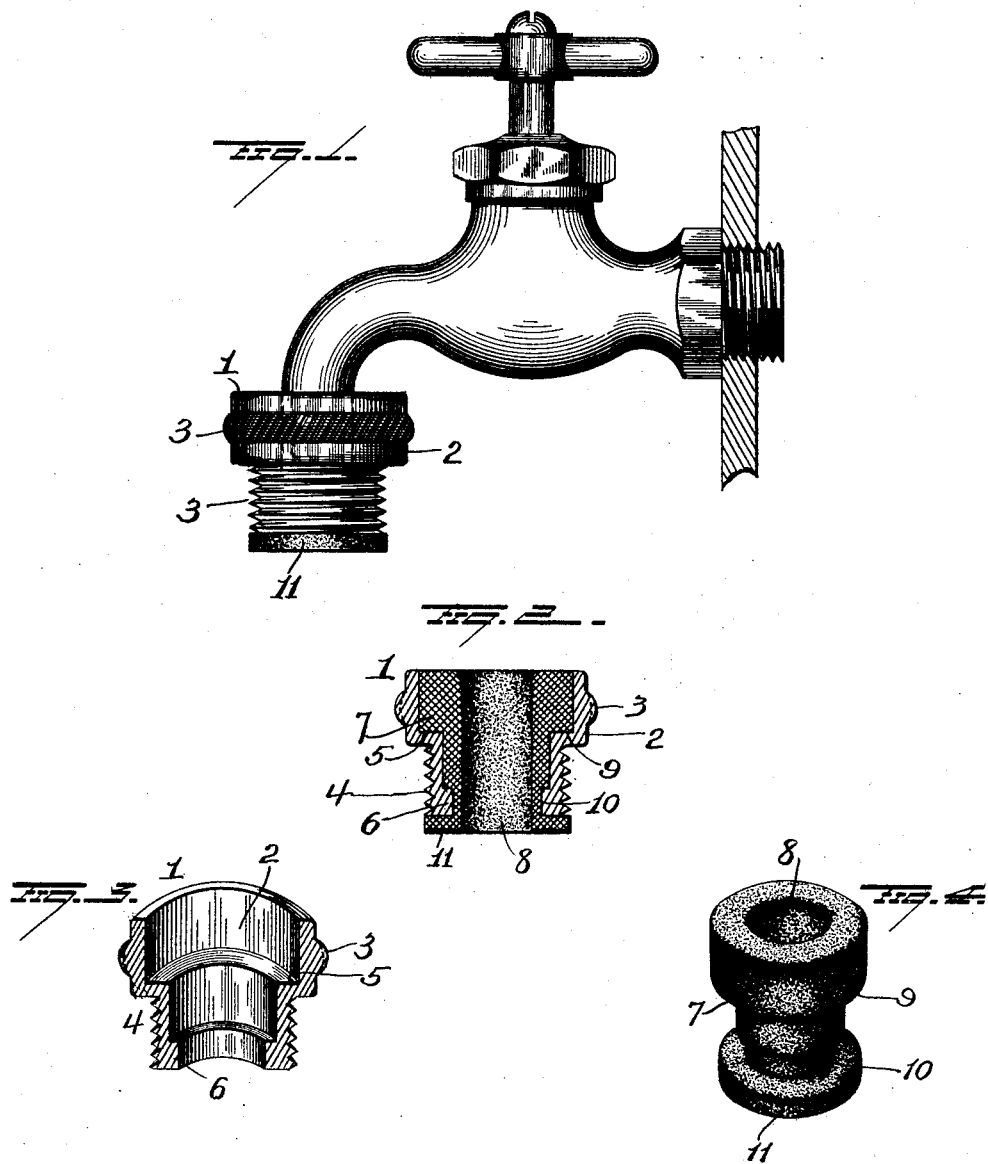

MATHEW J. WEBER, OF COLUMBUS, OHIO, ASSIGNOR TO THE OHIO PUMP & BRASS COMPANY, OF COLUMBUS, OHIO.

HOSE-COUPLING.

1,115,992.  Specification of Letters Patent.  Patented Nov. 3, 1914.

Application filed January 20, 1914. Serial No. 813,317.

*To all whom it may concern:*

Be it known that I, MATHEW J. WEBER, of Columbus, in the county of Franklin and State of Ohio, have invented certain new and useful Improvements in Hose-Couplings; and I do hereby declare the following to be a full, clear, and exact description of the invention, such as will enable others skilled in the art to which it appertains to make and use the same.

My invention relates to an improvement in hose couplings, the object being to provide an improved coupling adapted particularly for attaching a hose to a smooth faucet, and it consists in the parts and combination of parts as will be more fully described and pointed out in the claims.

In the accompanying drawings, Figure 1 is a view showing my improvement applied to a smooth faucet. Fig. 2 is a view in section of the coupling. Fig. 3 is a view in vertical section of the casing or body of the coupling, and Fig. 4 is a detached view of the yieldable bushing.

1 represents a casing, or body of the coupling, made of any suitable metal, and of two diameters exteriorly, the upper or larger diameter or section 2, being roughened or milled to enable it to be readily grasped and manipulated in placing it on and removing it from a faucet, and also for holding it while attaching the hose, and the lower section 4 screw threaded exteriorly for the attachment of a hose. This casing is hollow and is provided interiorly, intermediate its ends, with an annular shoulder 5, and at its extreme lower end with the inwardly projecting annular flange 6, all of said parts of the casing being cast integral. The bore of the casing is of two diameters, the portion thereof above the shoulder 5, being greater than the portion below said shoulder.

7 is the yieldable bushing preferably made of rubber, and provided with a central bore 8, and exteriorly, with an annular shoulder 9, adapted to rest on the internal shoulder 5 of the casing 1, and also with a peripheral groove 10 adapted to receive the flange 6 at the lower end of the casing. The extreme lower end 11 of the bushing 7 projects over and covers the outer face of flange 6, as shown in Fig. 2, and forms a washer, which, coacting with the hose coupling, prevents any leakage of water at this point. The upper end of the bushing is preferably flush with the upper end of the casing, and the external diameters of the bushing are as great as, and preferably slightly greater than the internal diameters of the casing, so that, when the bushing is in place, it will be held by the expansive action of the rubber or other yielding material of which it is composed. The parts are however positively held against accidental separation in one direction by the abutting shoulders on the casing and bushing, and in the other direction by the lower end 11 of the bushing, which as previously explained, overlaps the lower end of the casing, so that after the parts are once assembled, they are held together without the aid of any additional devices, and without any danger whatsoever of accidental displacement.

The bore of the bushing 7 should be slightly smaller than the standard size faucet, so that it will be expanded in placing it on a faucet, and hold by friction after it has been so placed. The extreme upper end of the bushing is of greater thickness than the lower portion, hence the bushing will readily give as the end of the faucet enters the bore, but as the end of the faucet approaches the narrower portion of the bushing, the force required to expand the latter will be greater, and the grip of the bushing on the faucet will be stronger, so that after the coupling has been applied to a faucet, it will be held thereon by friction alone.

The coupling may be applied to the hose first and then secured to the faucet, or it may be first secured to the faucet and the hose subsequently secured to it.

It is evident that changes in the construction and relative arrangement of the several parts might be made without avoiding my invention and hence I would have it understood that I do not restrict myself to the particular construction and arrangement of parts shown and described, but:

Having fully described my invention what I claim as new and desire to secure by Letters-Patent, is:

1. A coupling for attaching a hose to a smooth faucet, consisting of a hollow casing of two diameters internally, and a yieldable bushing having a bore of approximately the same diameter through its length and shaped externally to conform to the two diameters of the casing, and constructed at its smaller end to overlap the adjacent end of the casing whereby the bushing is locked within the casing, the large end of the bushing being flush with the larger end of the casing.

2. A coupling for attaching a hose to a smooth faucet, consisting of a hollow cylindrical casing, of two diameters externally the smaller diameter being externally threaded for the attachment of a hose, and provided with an inwardly projecting flange, and a yieldable bushing having an approximately cylindrical bore of uniform diameter, and shaped externally to conform to the internal shape of the casing the lower end of said bushing terminating in a washer which covers the lower or smaller end of the casing.

In testimony whereof, I have signed this specification in the presence of two subscribing witnesses.

MATHEW J. WEBER.

Witnesses:
D. L. DAVIES,
G. R. BENNA.